United States Patent
Nitta et al.

(10) Patent No.: US 11,496,086 B2
(45) Date of Patent: Nov. 8, 2022

(54) CONTROL DEVICE FOR MOTOR

(71) Applicants: JTEKT CORPORATION, Kariya (JP); TOYOTA JIDOSHA KABUSHIKI KAISHA, Toyota (JP); DENSO CORPORATION, Kariya (JP)

(72) Inventors: Shingo Nitta, Anjo (JP); Takahiro Toko, Takahama (JP); Takahiro Kojo, Gotenba (JP); Hisaya Akatsuka, Kariya (JP)

(73) Assignees: JTEKT CORPORATION, Kariya (JP); TOYOTA JIDOSHA KABUSHIKI KAISHA, Toyota (JP); DENSO CORPORATION, Kariya (JP)

( * ) Notice: Subject to any disclaimer, the term of this patent is extended or adjusted under 35 U.S.C. 154(b) by 0 days.

(21) Appl. No.: 17/465,564

(22) Filed: Sep. 2, 2021

(65) Prior Publication Data

US 2022/0077809 A1 Mar. 10, 2022

(30) Foreign Application Priority Data

Sep. 7, 2020 (JP) .............................. JP2020-150052

(51) Int. Cl.
*H02P 1/32* (2006.01)
*H02P 3/20* (2006.01)
*H02P 3/06* (2006.01)
*H02P 29/028* (2016.01)
*B62D 5/04* (2006.01)
*H02P 25/22* (2006.01)
*H02P 27/06* (2006.01)

(52) U.S. Cl.
CPC .......... *H02P 29/028* (2013.01); *B62D 5/0463* (2013.01); *H02P 25/22* (2013.01); *H02P 27/06* (2013.01)

(58) Field of Classification Search
CPC ........ H02P 29/028; H02P 25/22; H02P 27/06; B62D 5/0463
USPC .......................................................... 318/496
See application file for complete search history.

(56) References Cited

U.S. PATENT DOCUMENTS 10,156,832 B2 * 12/2018 Kitamoto ............... G05B 13/02
10,266,198 B2 * 4/2019 Fujita ................... B62D 5/0481
10,328,972 B2 * 6/2019 Fujita ...................... G01D 5/14
11,091,201 B2 * 8/2021 Fujita ................. B62D 15/0215
(Continued)

FOREIGN PATENT DOCUMENTS

EP          1 426 266 A2     6/2004
JP         2018-024335 A     2/2018
RU          2 731 400 C1     9/2020

OTHER PUBLICATIONS

Jan. 26, 2022 Extended Search Report issued in European Patent Application No. 21194590.2.

Primary Examiner — Erick D Glass
(74) Attorney, Agent, or Firm — Oliff PLC (57) ABSTRACT

A control device for a motor including a first coil and a second coil which are insulated from each other is provided. The control device includes a first circuit and a second circuit that switches a first process to a second process when the first circuit fails. The external circuit generates an instruction for performing a process of increasing an amount of operation which is calculated by one of the first circuit and the second circuit according to the number of control systems when the other of the first circuit and the second circuit fails.

16 Claims, 4 Drawing Sheets

(56) References Cited

U.S. PATENT DOCUMENTS

| | | |
|---|---|---|
| 11,251,732 B2 * | 2/2022 | Kawamura .......... B62D 5/0409 |
| 2018/0043928 A1 | 2/2018 | Fujita et al. |
| 2019/0291775 A1 | 9/2019 | Taki et al. |
| 2020/0114964 A1 | 4/2020 | Kim |
| 2020/0331522 A1 | 10/2020 | Yamashita et al. |

\* cited by examiner

CONTROL DEVICE FOR MOTOR

CROSS-REFERENCE TO RELATED APPLICATION

This application claims priority to Japanese Patent Application No. 2020-150052 filed on Sep. 7, 2020, incorporated herein by reference in its entirety.

BACKGROUND

1. Technical Field

The disclosure relates to a control device for a motor that turns turning wheels.

2. Description of Related Art

A control device that controls a motor which is a source of an assist torque which is applied to a steering mechanism of a vehicle is known. For example, a control device described in Japanese Unexamined Patent Application Publication No. 2018-24335 (JP 2018-24335 A) controls supply of electric power to a motor including windings of two systems which are independent of each other. The control device includes two groups of a drive circuit and a micro processing unit (MPU) to correspond to the windings of the two systems. The MPU of each system independently controls supply of electric power to the winding of the corresponding system by controlling the drive circuit of the corresponding system.

The MPU of each system calculates a current command value for a coil of the corresponding system based on a result of detection from a sensor of the corresponding system. When the sensors of the systems are normal, the current command value which is calculated by the MPU of one system is shared by the MPUs of the systems. When an abnormality has occurred in the sensor of one system, the current command value which is calculated by the MPU of the other system is shared by the MPUs of the systems (FIGS. 9 and 10). Accordingly, supply of electric power to the winding of the abnormal system can be continuously performed.

SUMMARY

With the control device for a motor described in JP 2018-24335 A, it is possible to cope with an abnormality of a sensor belonging to one system. However, for example, when a situation in which it is difficult to perform power supply control in the MPU of one system occurs, supply of electric power to only the winding of the other system is performed. Accordingly, when one system fails, there is concern about an assist torque required for the motor not being acquired.

The disclosure provides a control device for a motor that can appropriately cope with failure of some systems of a plurality of systems.

According to a first aspect of the disclosure, there is provided a control device for a motor that turns turning wheels of a vehicle and includes a first coil and a second coil which are insulated from each other. The control device includes: a first circuit that calculates a first amount of operation corresponding to a torque which is generated by the motor to feedback-control an angle which is able to be converted to a turning angle of the turning wheels and which is detected by a first sensor such that the angle becomes a target angle which is calculated by an external circuit and controls supply of electric power to the first coil based on a value which is obtained by dividing the first amount of operation according to the number of control systems; and a second circuit that calculates a second amount of operation corresponding to the torque which is generated by the motor to feedback-control an angle detected by a second sensor such that the angle becomes the target angle, selectively performs a first process of controlling supply of electric power to the second coil based on a value which is obtained by dividing the first amount of operation according to the number of control systems and a second process of controlling supply of electric power to the second coil based on a value which is obtained by dividing the second amount of operation according to the number of control systems, and switches the first process to the second process when the first circuit fails. The external circuit generates an instruction for performing a process of increasing an amount of operation which is calculated by one of the first circuit and the second circuit according to the number of control systems when the other of the first circuit and the second circuit fails.

With this configuration, when one of the first circuit and the second circuit fails, an amount of operation which is calculated by the other of the first circuit and the second circuit in accordance with the instruction from the external circuit is increased according to the number of control systems. Accordingly, even when one of the first circuit and the second circuit fails, a total torque which is generated by the motor is secured.

According to a second aspect of the disclosure, there is provided a control device for a motor which turns turning wheels of a vehicle and which includes a first coil and a second coil insulated from each other. The control device includes: a first circuit that calculates a first amount of operation corresponding to a torque which is generated by the motor to feedback-control an angle which is able to be converted to a turning angle of the turning wheels and which is detected by a first sensor such that the angle becomes a target angle which is calculated by an external circuit and controls supply of electric power to the first coil based on a value which is obtained by dividing the first amount of operation according to the number of control systems; and a second circuit that calculates a second amount of operation corresponding to the torque which is generated by the motor to feedback-control an angle detected by a second sensor such that the angle becomes the target angle and controls supply of electric power to the second coil based on a value which is obtained by dividing the second amount of operation according to the number of control systems. The external circuit generates an instruction for performing a process of increasing an amount of operation which is calculated by one of the first circuit and the second circuit according to the number of control systems when the other of the first circuit and the second circuit fails.

With this configuration, when one of the first circuit and the second circuit fails, an amount of operation which is calculated by the other of the first circuit and the second circuit in accordance with the instruction from the external circuit is increased according to the number of control systems. Accordingly, even when one of the first circuit and the second circuit fails, a total torque which is generated by the motor is secured.

In the control device for a motor, the external circuit may determine that one of the first circuit and the second circuit fails and generate the instruction when communication with one of the first circuit and the second circuit is disrupted and when an abnormality in mutual communication between the first circuit and the second circuit is recognized through communication with the other of the first circuit and the second circuit.

With this configuration, the external circuit can more quickly recognize failure of one of the first circuit and the second circuit through communication with the first circuit and communication with the second circuit.

The control device for a motor may further include a monitoring circuit that monitors at least whether an abnormal state of a source voltage of the first circuit and the second circuit is maintained for a set time. In this case, the first circuit and the second circuit may increase an amount of operation of one of the first circuit and the second circuit according to the number of control systems when it is recognized that the other of the first circuit and the second circuit fails based on a result of monitoring from the monitoring circuit.

With this configuration, when it is recognized that one of the first circuit and the second circuit fails based on at least the result of monitoring of the source voltage of the first circuit and the second circuit, the amount of operation of the other of the first circuit and the second circuit is increased according to the number of control systems. Accordingly, even when one of the first circuit and the second circuit fails, the total torque which is generated by the motor is secured.

Here, until the set time elapses after the source voltage of one of the first circuit and the second circuit has fallen into an abnormal state, the amount of operation of the other of the first circuit and the second circuit is not increased. Accordingly, there is concern about the total torque required for the motor not being secured. As a result, when the configuration of monitoring the source voltage of the first circuit and the second circuit is employed, it is preferable that the aforementioned configuration in which the external circuit recognizes failure of one of the first circuit and the second circuit through communication with the first circuit and communication with the second circuit be also employed. Since an abnormality in communication can be immediately detected, an amount of operation of one of the first circuit and the second circuit is immediately increased when the other of the first circuit and the second circuit fails.

In the control device for a motor, the monitoring circuit may also monitor mutual communication between the first circuit and the second circuit. In this case, the first circuit and the second circuit may not employ the instruction when the instruction is generated and it is recognized that the mutual communication between the first circuit and the second circuit is normal based on the result of monitoring.

It is conceivable that the instruction be erroneously generated by the external device. When mutual communication between the first circuit and the second circuit is being performed normally, the first circuit and the second circuit can be said to be operating normally. Accordingly, with the control device, when an instruction is generated by the external circuit even if mutual communication between the first circuit and the second circuit is normal, it is preferable that the instruction from the external circuit not be employed. With this configuration, the amount of operation which is calculated by one of the first circuit and the second circuit is prevented from increasing according to the number of control systems due to erroneous determination of the external circuit even if the first circuit and the second circuit are operating normally. As a result, it is possible to prevent an excessive output of the motor due to an erroneous output of the instruction.

In the control device for a motor, one of the first circuit and the second circuit may perform a process of decreasing its own amount of operation when the other of the first circuit and the second circuit is increasing its own amount of operation according to the number of control systems in accordance with the instruction.

It is conceivable that the instruction be erroneously generated by the external device. In this case, there is concern about the amount of operation calculated by one of the first circuit and the second circuit being increased according to the number of control systems due to erroneous determination of the external circuit even if the first circuit and the second circuit are operating normally. In this regard, with the configuration, when one of the first circuit and the second circuit increases its amount of operation according to the number of control systems in accordance with the instruction, the amount of operation of the other of the first circuit and the second circuit is decreased. Accordingly, it is possible to prevent an excessive output of the motor due to an erroneous output of the instruction.

In the control device for a motor, the first circuit or the second circuit may maintain a state in which its own amount of operation is increased according to the number of control systems when the instruction from the external circuit is disrupted after having started performing the process in accordance with the instruction.

For example, it is conceivable that communication between the external circuit and the first circuit, communication between the external circuit and the second circuit, or mutual communication between the first circuit and the second circuit be unstable. In this case, a state in which an instruction from the external circuit is supplied to the first circuit or the second circuit and a state in which the instruction is not supplied may be switched between frequently. In this regard, with the configuration, even if the instruction from the external circuit is disrupted, the first circuit or the second circuit maintains the state in which its own amount of operation has been increased according to the number of control systems. Accordingly, it is possible to prevent an operation state of the first circuit and the second circuit from frequently switching between a state in which a process based on the instruction is performed and a state in which a process based on the instruction is not performed.

In the control device for a motor, the first circuit may perform a process of calculating a first assist value for causing the motor to generate a steering assist force according to a steering state and adding the first assist value to the first amount of operation. In this case, the first circuit may perform a process of calculating a first assist correction value for cancelling out the first amount of operation for feedback-controlling the angle such that the angle becomes the target angle according to the steering state and adding the first assist correction value to the first amount of operation. The second circuit may perform a process of calculating a second assist value for causing the motor to generate a steering assist force according to the steering state and adding the second assist value to the second amount of operation. In this case, the second circuit may perform a process of calculating a second assist correction value for cancelling out the second amount of operation for feedback-controlling the angle such that the angle becomes the target angle according to the steering state and adding the second assist correction value to the second amount of operation.

With this configuration, when the first circuit and the second circuit perform feedback control of an angle which is able to be converted to the turning angle of the turning wheels such that the angle becomes the target angle and a driver's steering intervention occurs, the amount of operation for feedback-controlling the angle which is able to be converted to the turning angle of the turning wheels such that the angle becomes the target angle is cancelled out with the assist correction value. Accordingly, the motor generates an assist force corresponding to the steering state. The driver's steering is assisted with the assist force. When one of the first circuit and the second circuit is performing a process based on the instruction, the amount of operation which is calculated by the other of the first circuit and the second circuit is increased according to the number of control systems. On the other hand, the assist correction value which is calculated by the other of the first circuit and the second circuit is merely a value corresponding to the steering state. Accordingly, the amount of operation which is calculated by the other of the first circuit and the second circuit cannot be sufficiently cancelled out. As a result, a reaction force at the time of the driver's steering is slightly increased. With this increase of the reaction force, the driver can be aware of an abnormality of the control device.

In the control device for a motor, one of the first circuit and the second circuit may increase an assist correction value calculated thereby according to the number of control systems when the other of the first circuit and the second circuit performs control in accordance with the instruction.

With this configuration, when one of the first circuit and the second circuit is performing control based on an instruction generated by the external circuit and a driver's steering intervention occurs, the assist correction value of the other of the first circuit and the second circuit is increased according to the number of control systems and thus the amount of operation of the other of the first circuit and the second circuit is appropriately cancelled out. Accordingly, when one of the first circuit and the second circuit is performing control based on an instruction generated by the external circuit and a driver's steering intervention occurs, the motor generates an assist force corresponding to the assist value. As a result, it is possible to appropriately assist with the driver's steering.

With the control device for a motor according to the aspect, it is possible to appropriately cope with failure of some systems of a plurality of systems.

BRIEF DESCRIPTION OF THE DRAWINGS

Features, advantages, and technical and industrial significance of exemplary embodiments of the disclosure will be described below with reference to the accompanying drawings, in which like signs denote like elements, and wherein.

DETAILED DESCRIPTION OF EMBODIMENTS

First Embodiment

Figure 1:
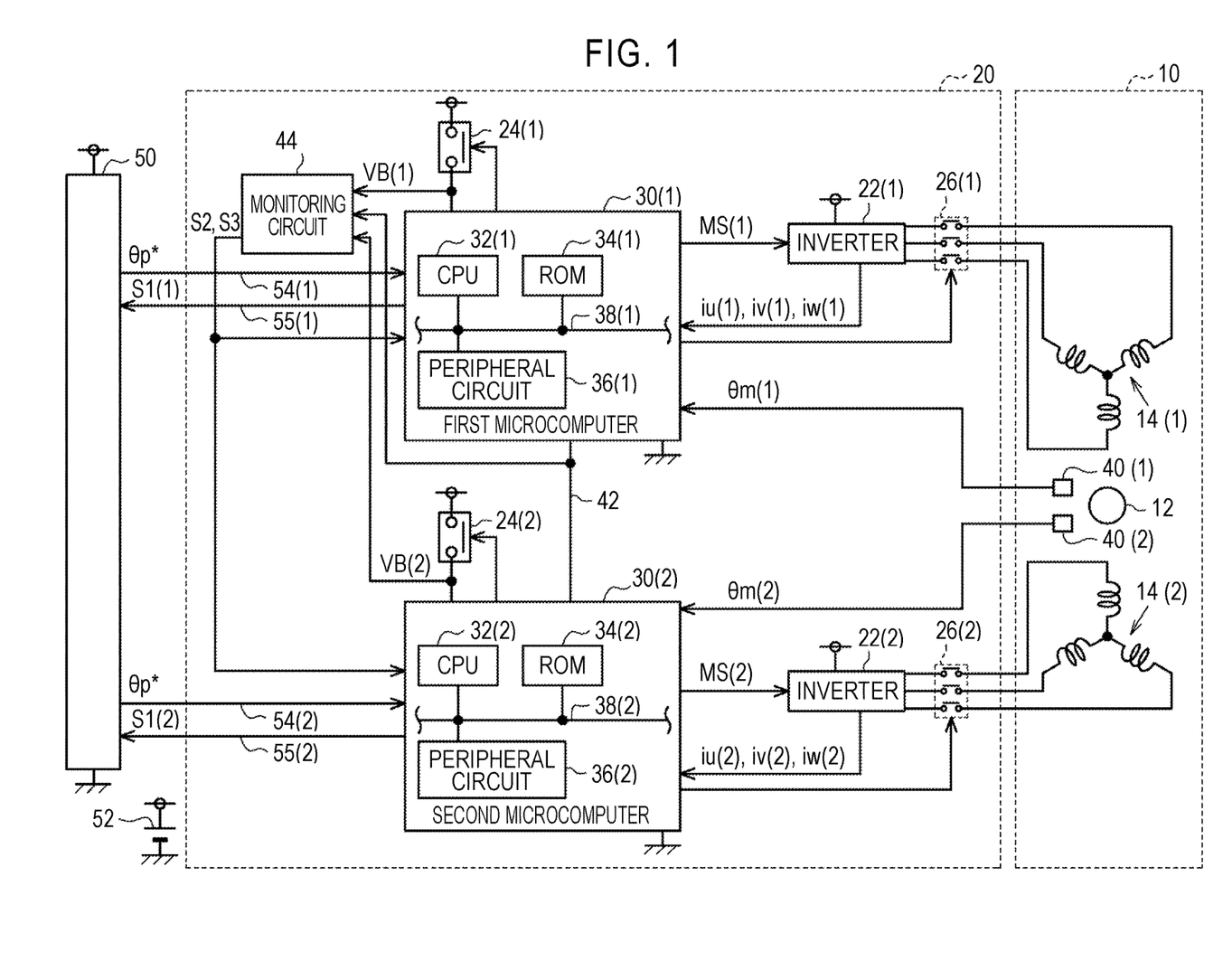
FIG. 1 is a block diagram illustrating a control device for a motor according to a first embodiment.

Hereinafter, a control device for a motor according to a first embodiment of the disclosure will be described with reference to the accompanying drawings. As illustrated in FIG. 1, a motor 10 is a power source for a turning actuator that turns turning wheels of a vehicle. The turning shaft includes, for example, a turning shaft that turns the turning wheels and a pinion shaft that rotates along with the turning shaft. A torque which is generated by the motor 10 is transmitted to the turning shaft or the pinion shaft via a reduction gear mechanism. A steering wheel is connected to the pinion shaft via a steering shaft.

For example, a surface permanent magnet synchronous motor (SPMSM) is employed as the motor 10. The motor 10 includes a rotor 12, a first stator coil 14(1), and a second stator coil 14(2). The motor 10 is controlled by a control device 20.

The control device 20 controls a torque which is a control parameter of the motor 10. The control device 20 includes a circuit of a first system and a circuit of a second system. The circuit of the first system corresponds to the first stator coil 14(1). The circuit of the second system corresponds to the second stator coil 14(2).

The circuit of the first system includes a first inverter 22(1) and a first microcomputer 30(1). The first inverter 22(1) is connected to the first stator coil 14(1). The first microcomputer 30(1) controls a current flowing in the first stator coil 14(1) by outputting an operation signal MS(1) to the first inverter 22(1). The circuit of the second system includes a second inverter 22(2) and a second microcomputer 30(2). The second inverter 22(2) is connected to the second stator coil 14(2). The second microcomputer 30(2) controls a current flowing in the second stator coil 14(2) by outputting an operation signal MS(2) to the second inverter 22(2). The first microcomputer 30(1) and the second microcomputer 30(2) can communicate with each other via a communication line 42.

In the following description, when the first system and the second system are collectively denoted, as in, for example, "a k-th inverter 14(k) is connected to a k-th stator coil 14(k)," ing a symbol "k" which can have a value of "1" or "2" Is used.

The k-th microcomputer 30(k) acquires a rotation angle θm(k) of a rotor 12 which is detected by a k-th angle sensor 40(k) and three phase currents iu(k), iv(k), and iw(k) flowing in the k-th stator coil 14(k). The values of the currents iu(k), iv(k), and iw(k) can be detected, for example, as voltage drops of shunt resistors which are provided in legs of the k-th inverter 22(k).

The k-th microcomputer 30(k) includes a CPU 32(k), a ROM 34(k), and a peripheral circuit 36(k). The CPU 32(k), the ROM 34(k), and the peripheral circuit 36(k) can communicate with each other via a local network 38(k). The peripheral circuit 36(k) includes a circuit that generates a clock signal for defining internal operations based on an external clock signal, a power supply circuit, and a reset circuit.

The first microcomputer 30(1) and the second microcomputer 30(2) can communicate with a host ECU 50 which is an external circuit via communication lines 54(1) and 54(2) and communication lines 55(1) and 55(2). The first microcomputer 30(1) and the second microcomputer 30(2) receive a target angle θp* which is generated by the host ECU 50 via the communication lines 54(1) and 54(2).

The first microcomputer 30(1) and the second microcomputer 30(2) determine whether mutual communication between the first microcomputer 30(1) and the second microcomputer 30(2) (hereinafter also referred to as "inter-microcomputer communication") is normal. For example, the first microcomputer 30(1) and the second microcomputer 30(2) periodically exchange predetermined data via a communication line 42, determine that the inter-microcomputer communication is normal when exchange of the data is possible, and determine that the inter-microcomputer communication is abnormal when exchange of the data is not possible. The first microcomputer 30(1) generates an electrical signal S1(1) indicating a result of determination indicating whether communication with the second microcomputer 30(2) is normal. The second microcomputer 30(2) generates an electrical signal S1(2) indicating a result of determination indicating whether communication with the first microcomputer 30(1) is normal.

The host ECU 50 comprehensively controls control devices for various onboard systems. The host ECU 50 acquires an optimal control method based on a vehicle state at that time and instructs various onboard control devices to perform individual control according to the acquired control method. The host ECU 50 intervenes in control which is performed by the control device 20. The host ECU 50 switches its own automated driving control function between ON and OFF based on an operation of a switch (not illustrated) which is provided on a driver's seat or the like.

When the automated driving control function of the host ECU 50 is turned on, an entity that operates a steering wheel is the host ECU 50, and the control device 20 performs turning control (automatic steering control) for turning the turning wheels through control of the motor 10 based on an instruction from the host ECU 50. For example, the host ECU 50 calculates a target angle $\theta p^*$ as a command value for causing the vehicle to travel in a target lane. The target angle $\theta p^*$ is a target of a turning angle required to cause the vehicle to travel along a lane, a target value of a rotation angle of a pinion shaft, or a target value of a rotation angle of a steering shaft according to a traveling state of the vehicle at that time. The rotation angle of the pinion shaft and the rotation angle of the steering shaft is an angle which is able to be converted to the turning angle of the turning wheels.

A terminal voltage of a battery 52 which is mounted in the vehicle is applied to the host ECU 50, the k-th microcomputer 30($k$), and the k-th inverter 22($k$). Here, the voltage of the battery 52 is applied to the k-th microcomputer 30($k$) via a relay 24($k$). A relay 26($k$) is provided between the kth inverter 22($k$) and the k-th stator coil 14($k$).

The control device 20 includes a monitoring circuit 44 in addition to the circuit of the first system and the circuit of the second system. The terminal voltage of the battery 52 is applied to the monitoring circuit 44. The monitoring circuit 44 receives a source voltage VB(1) of the first microcomputer 30(1) and a source voltage VB(2) of the second microcomputer 30(2) and determines whether the received source voltages VB(1) and VB(2) are normal. The monitoring circuit 44 determines that the source voltages VB(1) and VB(2) are normal, for example, when a state in which the source voltages VB(1) and VB(2) are less than a predetermined voltage threshold value is maintained for a set time. The set time is set in view of prevention of erroneous determination by the monitoring circuit 44. Accordingly, it is possible to prevent an instantaneous voltage drop from being determined to be an abnormality. The monitoring circuit 44 generates a first monitoring result signal S2 indicating a result of monitoring indicating whether the source voltages VB(1) and VB(2) are normal.

The monitoring circuit 44 also determines whether communication between the first microcomputer 30(1) and the second microcomputer 30(2) is normal. The monitoring circuit 44 determines whether communication between the first microcomputer 30(1) and the second microcomputer 30(2) is normal, for example, based on whether exchange of data between the first microcomputer 30(1) and the second microcomputer 30(2) via the communication line 42 is being performed. The monitoring circuit 44 generates a second monitoring result signal S3 indicating whether communication between the first microcomputer 30(1) and the second microcomputer 30(2) is normal. The first microcomputer 30(1) and the second microcomputer 30(2) receive the first monitoring result signal S2 and the second monitoring result signal S3 which are generated by the monitoring circuit 44.

The host ECU 50 detects whether the first microcomputer 30(1) or the second microcomputer 30(2) is normal based on whether the following two conditions A1 and A2 are satisfied.

<A1> Mutual communication between the first microcomputer 30(1) and the second microcomputer 30(2) via the communication line 42 is disrupted.

<A2> Communication with the first microcomputer 30(1) via the communication line 55(1) or communication with the second microcomputer 30(2) via the communication line 55(2) is disrupted.

The host ECU 50 can recognize whether mutual communication between the first microcomputer 30(1) and the second microcomputer 30(2) via the communication line 42 is disrupted based on the electrical signal S1(1) which is transmitted from the first microcomputer 30(1) via the communication line 55(1) or the electrical signal S1(2) which is transmitted from the second microcomputer 30(2) via the communication line 55(2).

The host ECU 50 can recognize whether communication with the first microcomputer 30(1) or communication with the second microcomputer 30(2) is disrupted when the electrical signal S1(1) which is periodically generated by the first microcomputer 30(1) or the electrical signal S1(2) which is periodically generated by the second microcomputer 30(2) is not received.

The host ECU 50 determines that the first microcomputer 30(1) is abnormal and the second microcomputer 30(2) is normal when communication with the first microcomputer 30(1) is disrupted and it is recognized that mutual communication between the first microcomputer 30(1) and the second microcomputer 30(2) is disrupted using the electrical signal S1(2). The host ECU 50 determines that the first microcomputer 30(1) is normal and the second microcomputer 30(2) is abnormal when communication with the second microcomputer 30(2) is disrupted and it is recognized that mutual communication between the first microcomputer 30(1) and the second microcomputer 30(2) is disrupted using the electrical signal S1(1).

When it is determined that one of the first microcomputer 30(1) and the second microcomputer 30(2) is abnormal, the host ECU 50 generates an instruction S4 for the normal microcomputer out of the first microcomputer 30(1) and the second microcomputer 30(2). This instruction S4 is a command for causing the normal microcomputer to increase a current which is supplied to a stator coil of the corresponding system.

Process of k-th Microcomputer

Figure 2:
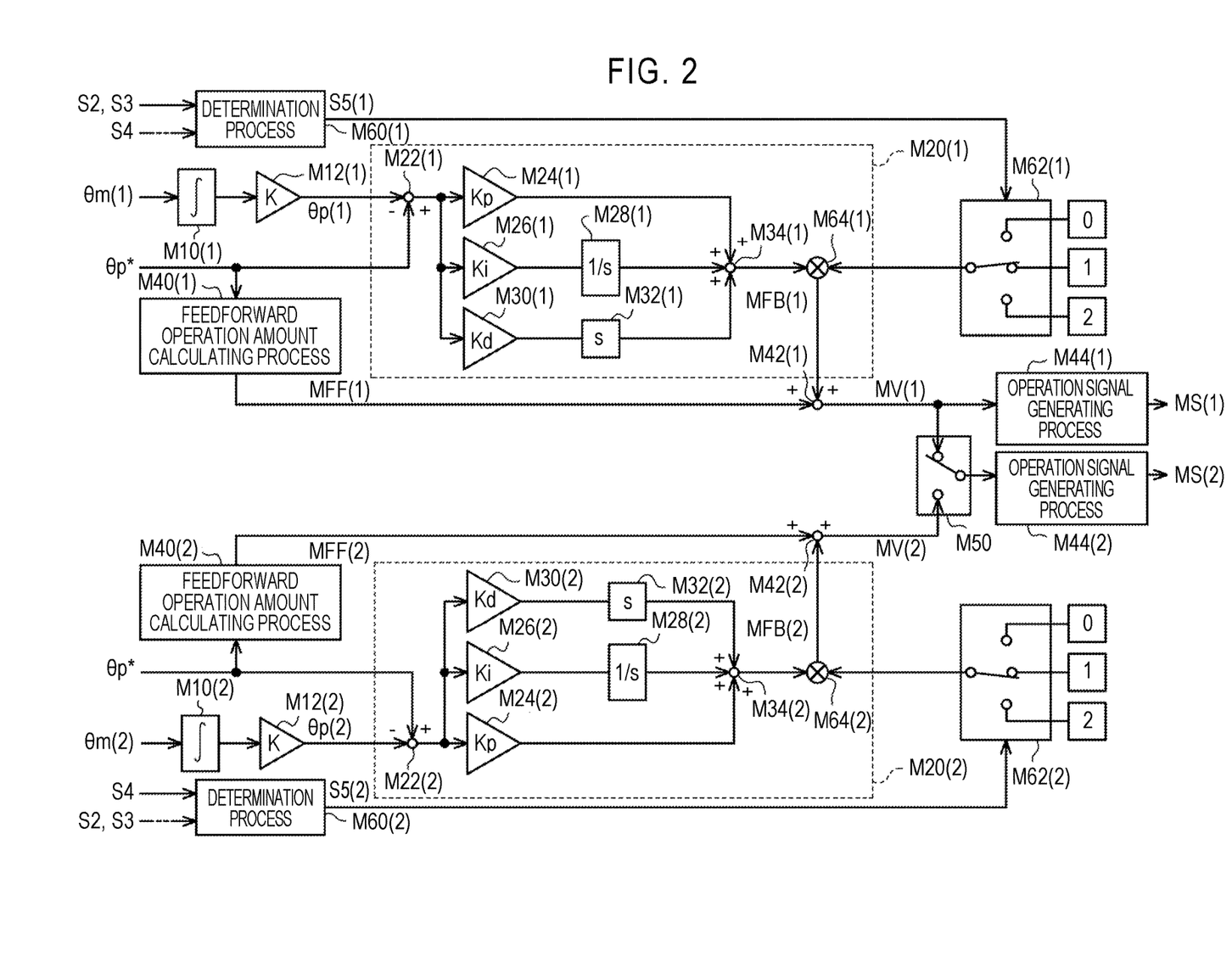
FIG. 2 is diagram illustrating a part of a routine which is performed by the control device for a motor according to the first embodiment when two systems are both normal.

Processes which are performed by the k-th microcomputer 30($k$) will be described below with reference to FIG. 2. The processes illustrated in FIG. 2 are realized by causing the CPU 32($k$) to execute a program stored in the ROM 34($k$). In the following description, the processes which are performed by the first microcomputer 30(1) and the second microcomputer 30(2) are collectively denoted using "k."

An integral process M10($k$) is a process of integrating the rotation angle $\theta m(k)$ of the rotor 12. A conversion process M12($k$) is a process of converting an output of the integral process M10(k) to a rotation angle θp(k) of the steering shaft by multiplying the output by a predetermined coefficient K. The rotation angle θp(k) is zero at a neutral position of the turning shaft corresponding to a traveling state in which the vehicle travels straight ahead and a positive or negative sign thereof differs depending on whether it is a right turn or a left turn.

A feedback operation amount calculating process M20(k) is a process of calculating a feedback operation amount MFB(k) which is an amount of operation for feedback-controlling the rotation angle θp(k) such that it becomes the target angle θp*. In the feedback operation amount calculating process M20(k), the feedback operation amount MFB(k) is calculated as a sum of an output value of a proportional element, an output value of an integral element, and an output value of a differential element. Specifically, the feedback operation amount calculating process M20(k) is as follows.

That is, a difference calculating process M22(k) is a process of calculating a difference between the rotation angle θp(k) and the target angle θp*. A proportional element M24(k) is a process of multiplying the difference between the rotation angle θp(k) and the target angle θp* which is an output of the difference calculating process M22(k) by a proportional coefficient Kp. The integral element includes an integral gain multiplying process M26(k) and an integral process M28(k). The integral gain multiplying process M26(k) is a process of multiplying the difference between the rotation angle θp(k) and the target angle θp* which is an output of the difference calculating process M22(k) by an integral gain Ki. The integral process M28(k) is a process of updating an integral value of an output of the integral gain multiplying process M26(k) and outputting the updated integral value of the output of the integral gain multiplying process M26(k). The differential element includes a differential gain multiplying process M30(k) and a differential process M32(k). The differential gain multiplying process M30(k) is a process of multiplying the difference between the rotation angle θp(k) and the target angle θp* which is the output of the difference calculating process M22(k) by a differential gain Kd. The differential process M32(k) is a process of differentiating an output of the differential gain multiplying process M30(k). An addition process M34(k) is a process of calculating a sum of the output values of the proportional element M24(k), the integral process M28(k), and the differential process M32(k) and outputting the calculated sum as the feedback operation amount MFB(k).

A feedforward operation amount calculating process M40(k) is a process of calculating a feedforward operation amount MFF(k) which is an amount of operation for controlling the rotation angle θm(k) such that it becomes the target angle θp*. In the feedforward operation amount calculating process M40(k), the feedforward operation amount MFF(k) with a larger absolute value is calculated as the absolute value of the target angle θp* is larger. This calculation process can be realized, for example, by causing the CPU 32(k) to map-calculate the feedforward operation amount MFF(k) in a state in which map data with the target angle θp* as an input variable and with the feedforward operation amount MFF(k) as an output variable is stored in the ROM 34(k) in advance. Here, map data is group data including discrete values of the input variable and values of the output variable corresponding to the values of the input variable. In the map calculation, for example, the value of the output variable of the corresponding map data is output as a result of calculation when the value of the input variable matches one of the values of the input variable of the map data. In the map calculation, a value acquired by interpolation using a plurality of values of the output variable included in the map data is output as the result of calculation when the value of the input variable does not match any value of the input variable in the map data.

An addition process M42(k) is a process of calculating a k-th operation amount MV(k) by summing the feedback operation amount MFB(k) and the feedforward operation amount MFF(k). The k-th operation amount MV(k) is a q-axis current command value.

A first operation signal generating process M44(1) is a process of calculating an operation signal MS(1) of the first inverter 22(1) using a value which is acquired by dividing a first operation amount MV(1) according to the number of control systems (two systems herein). That is, the first operation signal generating process M44(1) is a process of calculating the operation signal MS(1) of the first inverter 22(1) such that a q-axis current flowing in the first stator coil 14(1) becomes "½" of the first operation amount MV(1) and outputting the calculated operation signal MS(1).

A selection process M50 is a process of selectively outputting one of the first operation amount MV(1) calculated in the addition process M42(1) and the second operation amount MV(2) calculated in the addition process M42(2) to a second operation signal generating process M44(2).

The second operation signal generating process M44(2) is a process of calculating an operation signal MS(2) of the second inverter 22(2) using a value acquired by dividing the first operation amount MV(1) or the second operation amount MV(2) which is selected in the selection process M50 according to the number of control systems (two herein). That is, the second operation signal generating process M44(2) is a process of calculating the operation signal MS(2) of the second inverter 22(2) such that a q-axis current flowing in the second stator coil 14(2) becomes "½" of the output of the selection process M50 and outputting the calculated operation signal MS(2) in principle.

A determination process M60(k) is a process of determining whether the first microcomputer 30(1) and the second microcomputer 30(2) are operating normally. Specifically, the determination process M60(k) performs the following three processes B1, B2, and B3.

<B1> A process of determining whether the source voltage VB(1) of the first microcomputer 30(1) and the source voltage VB(2) of the second microcomputer 30(2) are normal based on the first monitoring result signal S2 which is generated by the monitoring circuit 44.

<B2> A process of determining whether mutual communication between the first microcomputer 30(1) and the second microcomputer 30(2) is normal based on the second monitoring result signal S3 which is generated by the monitoring circuit 44.

<B3> A process of determining whether control based on the instruction S4 is to be performed based on the second monitoring result signal S3 which is generated by the monitoring circuit 44 when the instruction S4 is generated by the host ECU 50.

A selection process M62(k) is a process of selecting one of gains "0," "1", and "2" which are three fixed values stored in the ROM 34(k) based on a result of determination from the determination process M60(k). In the selection process M62(k), the gain "1" is selected when the result of determination from the determination process M60(k) indicates that the source voltage VB(k) of the k-th microcomputer 30(k) of the corresponding system is normal. In the selection process M62(k), the gain "0" is selected when the result of determination from the determination process M60(k) indicates that the source voltage VB(k) of the k-th microcomputer 30(k) of the corresponding system is abnormal. In the selection process M62(k), the gain "2" is selected when the result of determination from the determination process M60(k) indicates that the source voltage VB(k) of the system other than the corresponding system is abnormal. In the selection process M62(k), the gain "2" is also selected when the result of determination from the determination process M60(k) indicates control based on the instruction S4 is to be performed.

A multiplication process M64(k) is a process of multiplying the gain selected in the selection process M62(k) by the feedback operation amount MFB(k) calculated in the addition process M34(k).

<Operation of CPU 32(k)>

The operation of the CPU 32(k) will be described below.

As illustrated in FIG. 2, the CPU 32(1) selects the gain "1" in the selection process M62(1) when the following two results of determination C1 and C2 are acquired in the determination process M60(1).

<C1> The source voltage VB(1) of the first microcomputer 30(1) and the source voltage VB(2) of the second microcomputer 30(2) are normal.

<C2> Mutual communication between the first microcomputer 30(1) and the second microcomputer 30(2) is normal.

When the results of determination C1 and C2 are obtained, the instruction S4 is not basically generated by the host ECU 50. This is because the source voltage VB(k) of the CPU 32(k) is normal and the mutual communication between the first microcomputer 30(1) and the second microcomputer 30(2) is normal. Here, it is conceivable that the instruction S4 is erroneously generated because the host ECU 50 erroneously determines one of the first microcomputer 30(1) and the second microcomputer 30(2) to be abnormal. In this case, in the determination process M60(1), it is determined that the instruction S4 is not to be employed when the instruction S4 is generated by the host ECU 50 and the result of determination C2 is obtained.

When the gain "1" is selected in the selection process M62(1), a value which is obtained by multiplying the feedback operation amount MFB(1) calculated in the addition process M34(1) by the gain "1" is used as the final feedback operation amount MFB(1). The operation signal MS(1) for operating the first inverter 22(1) is generated in the first operation signal generating process M44(1) such that the q-axis current flowing in the first stator coil 14(1) is "½" of the first operation amount MV(1). In addition, the CPU 32(1) outputs the first operation amount MV(1) in which the final feedback operation amount MFB(1) is reflected to the second microcomputer 30(2) via the communication line 42.

Similarly to the CPU 32(1), the CPU 32(2) selects the gain "1" in the selection process M62(2) when the two results of determination C1 and C2 are obtained in the determination process M60(2). The CPU 32(2) employs the first operation amount MV(1) which is output from the CPU 32(1) in the selection process M50 when the results off determination C1 and C2 are obtained. Accordingly, the operation signal MS(2) for operating the second inverter 22(2) is generated in the second operation signal generating process M44(2) such that the q-axis current flowing in the second stator coil 14(2) is "½" of the first operation amount MV(1).

<Failure of One System: Driving of One System>

Figure 3:
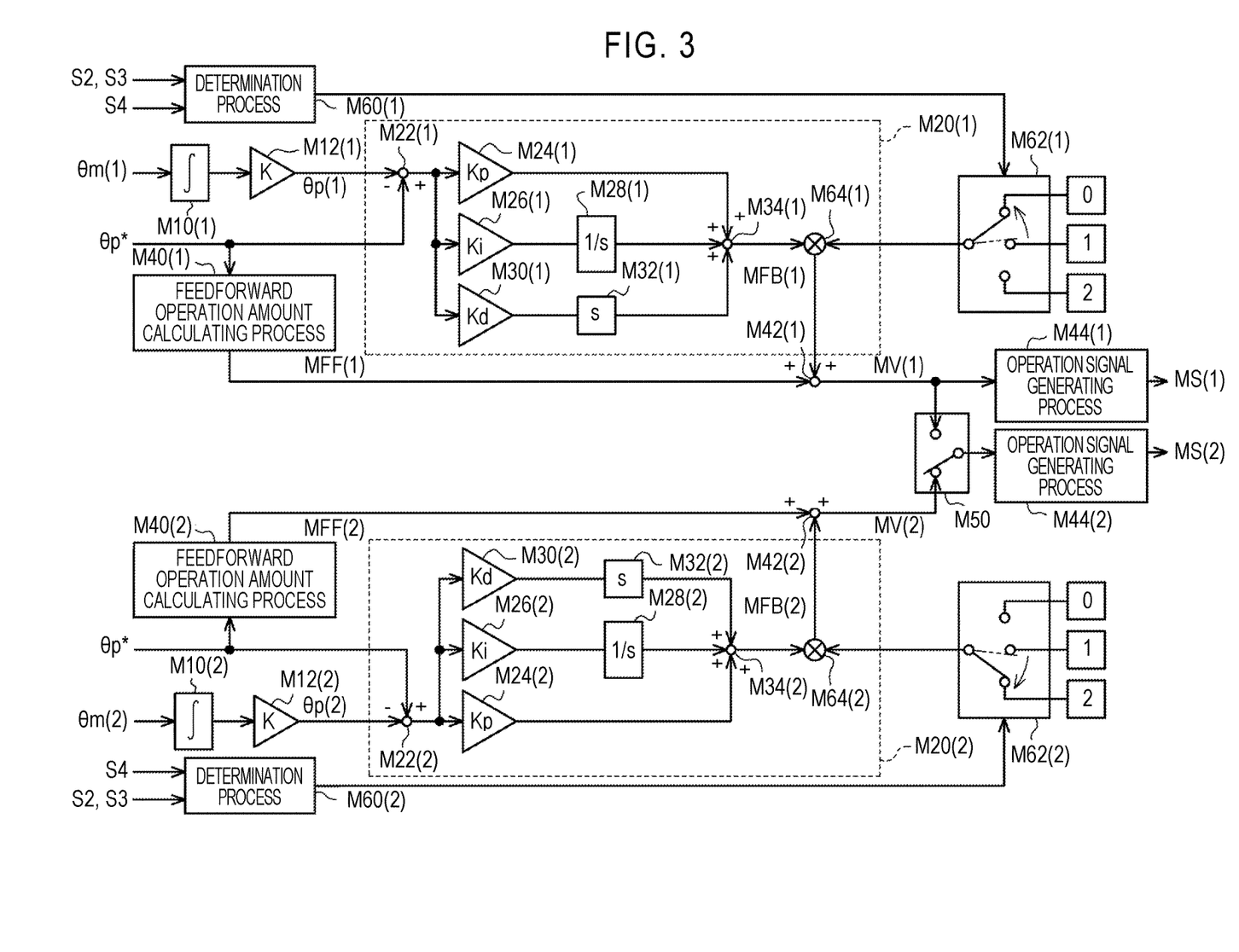
FIG. 3 is diagram illustrating a part of a routine which is performed by the control device for a motor according to the first embodiment when one system of two systems fails.

As illustrated in FIG. 3, the CPU 32(1) selects the gain "0" in the selection process M62(1) when the following two results of determination D1 and D2 are obtained in the determination process M60(1).

<D1> The source voltage VB(1) of the first microcomputer 30(1) is abnormal and the source voltage VB(2) of the second microcomputer 30(2) is normal.

<D2> Mutual communication between the first microcomputer 30(1) and the second microcomputer 30(2) is abnormal.

When the results of determination D1 and D2 are obtained, a value which is obtained by multiplying the feedback operation amount MFB(1) which is calculated in the addition process M34(1) by the gain "0" is used as the final feedback operation amount MFB(1). In addition, when the results of determination D1 and D2 are obtained, the CPU 32(1) switches the relays 24(1) and 26(1) from a closed state to an open state via the peripheral circuit 36(1).

Similarly to the CPU 32(1), the CPU 32(2) employs the second operation amount MV(2) in the selection process M50 when the results of determination D1 and D2 are obtained in the determination process M60(2). When the results of determination D1 and D2 are obtained in the determination process M60(2), the CPU32(2) selects the gain "2" in the selection process M62(2). Accordingly, the final feedback operation amount MFB(2) which is used in the addition process M42(2) has a value which doubles the feedback operation amount MFB(2) calculated in the addition process M34(2). That is, the decrease of the feedback operation amount MFB(1) is compensated for by increasing the feedback operation amount MFB(2).

In the second operation signal generating process M44(2), the operation signal MS(2) for operating the second inverter 22(2) is generated such that the q-axis current flowing in the second stator coil 14(2) is "½" of the second operation amount MV(2). The feedback operation amount MFB(2) having a value which doubles the original feedback operation amount MFB(2) calculated in the addition process M34(2) is reflected in the second operation amount MV(2). Accordingly, conclusively, the operation signal MS(2) for operating the second inverter 22(2) is generated such that the q-axis current flowing in the second stator coil 14(2) becomes the feedback operation amount MFB(2) which is calculated in the addition process M34(2). That is, since electric power is not supplied to the first stator coil 14(1), the q-axis current flowing in the second stator coil 14(2) needs to be the second operation amount MV(2) in which 100% of the feedback operation amount MFB(2) calculated in the addition process M34(2) is reflected in order to control the rotation angle θp(2) such that it becomes the target angle θp*.

When the source voltage VB(1) of the first microcomputer 30(1) is normal and the source voltage VB(2) of the second microcomputer 30(2) is abnormal, the first microcomputer 30(1) and the second microcomputer 30(2) perform inverse operations of those when the source voltage VB(1) is abnormal and the source voltage VB(2) is normal.

Multiplication Mode

As described above, when one system of the circuit of the first system and the circuit of the second system in the control device 20 fails, the operation state of the control device 20 transitions to a so-called one-system driving state in which supply of electric power to the motor 10 is controlled using a circuit of a normal system. In the one-system driving state, a torque required for the motor 10 to generate can be secured but there is the following concern.

That is, the monitoring circuit 44 determines that the source voltage VB(k) of the k-th microcomputer 30(k) is abnormal when a state in which the source voltage VB(k) is less than a predetermined voltage threshold value is maintained for a set time. Accordingly, until the set time elapses after an abnormality of the source voltage VB(k) has been detected and the abnormality is determined, that is, until the operation state of the control device 20 transitions to the one-system driving state, after the abnormality of the source voltage VB(k) has been detected, supply of electric power to the motor coil of the abnormal system is stopped and the state in which the feedback operation amount MFB(k) of the normal system is multiplied by the gain "1" is maintained. In the k-th operation signal generating process M44(k) of the normal system, the operation signal MS(k) for operating the k-th inverter 22(k) is generated such that the q-axis current flowing in the k-th stator coil 14(k) is "½" of the k-th operation amount MV(k). Accordingly, until the operation state of the control device 20 transitions to the one-system driving state, the torque generated by the motor 10 is about a half of the torque which is generated when both systems are normal. Therefore, the CPU 32(k) performs the following processes.

That is, the CPU 32(1) selects the gain "0" in the selection process M62(1) when the following two results of determination E1 and E2 are obtained in the determination process M60(1).

<E1> Mutual communication between the first microcomputer 30(1) and the second microcomputer 30(2) is abnormal.

<E2> The instruction S4 is generated by the host ECU 50.

In the determination process M60(1), it is determined that a process based on the instruction S4 is to be performed when the instruction S4 is generated by the host ECU 50 and the mutual communication between the first microcomputer 30(1) and the second microcomputer 30(2) is abnormal.

Accordingly, when the results of determination E1 and E2 are obtained, a value which is obtained by multiplying the feedback operation amount MFB(1) which is calculated in the addition process M34(1) by the gain "0" is used as the final feedback operation amount MFB(1). In addition, when the results of determination E1 and E2 are obtained, the CPU 32(1) switches the relays 24(1) and 26(1) from a closed state to an open state via the peripheral circuit 36(1).

Similarly to the CPU 32(1), the CPU 32(2) employs the second operation amount MV(2) in the selection process M50 when the results of determination E1 and E2 are obtained in the determination process M60(2). When the results of determination E1 and E2 are obtained in the determination process M60(2), the CPU32(2) selects the gain "2" in the selection process M62(2). Accordingly, the final feedback operation amount MFB(2) which is used in the addition process M42(2) has a value which doubles the feedback operation amount MFB(2) calculated in the addition process M34(2). That is, the decrease of the feedback operation amount MFB(1) is compensated for by increasing the feedback operation amount MFB(2).

Accordingly, the feedback operation amount MFB(2) having a value which doubles the original feedback operation amount MFB(2) calculated in the addition process M34(2) is reflected in the second operation amount MV(2). Accordingly, in the second operation signal generating process M44(2), the operation signal MS(2) for operating the second inverter 22(2) is generated such that the q-axis current flowing in the second stator coil 14(2) becomes the original feedback operation amount MFB(2) which is calculated in the addition process M34(2).

When the source voltage VB(1) of the first microcomputer 30(1) is normal and the source voltage VB(2) of the second microcomputer 30(2) is abnormal, the first microcomputer 30(1) and the second microcomputer 30(2) perform inverse operations of those when the source voltage VB(1) is abnormal and the source voltage VB(2) is normal.

In this way, without particularly waiting that the state in which the source voltage of the microcomputer of the abnormal system is less than the predetermined voltage threshold value is maintained for the set time as the result of monitoring from the monitoring circuit 44, the feedback operation amount MFB(k) which is calculated in the feedback operation amount calculating process M20(k) of the normal system based on the instruction S4 from the host ECU 50 is increased. Accordingly, even when one of the first microcomputer 30(1) and the second microcomputer 30(2) fails, the motor 10 early generates the same degree of torque as the torque which is generated when both the microcomputers of two systems are normal. That is, unlike the aforementioned one-system driving state, when one of the first microcomputer 30(1) and the second microcomputer 30(2) fails, a period in which the torque generated by the motor 10 becomes about a half of the torque which is originally required is shortened.

Advantages of First Embodiment

Accordingly, according to the first embodiment, the following advantages can be obtained. (1) When one of the first microcomputer 30(1) and the second microcomputer 30(2) fails, an amount of operation which is calculated by the other of the first microcomputer 30(1) and the second microcomputer 30(2) in accordance with the instruction S4 from the host ECU 50 is increased according to the number of control systems. Accordingly, even when one of the first microcomputer 30(1) and the second microcomputer 30(2) fails, the total torque which is generated by the motor 10 is secured. As a result, it is possible to more appropriately cope with failure of one of two systems.

(2) When an abnormality occurs in the source voltage of the microcomputer of one system, the microcomputer of the normal system increases an amount of current which is supplied to the stator coil of the normal system in accordance with the instruction S4 from the host ECU 50 without waiting for the result of monitoring from the monitoring circuit 44. Accordingly, the motor 10 early generates the same degree of torque as the total torque generated by the motor 10 in a normal state. Here, the host ECU 50 detects failure of one system based on the result of detection indicating that communication with the first microcomputer 30(1) is disrupted, that communication with the second microcomputer 30(2) is disrupted, and that communication between the microcomputers is disrupted without monitoring the source voltages of the microcomputers. Disruption of communication can be immediately detected. Accordingly, the host ECU 50 can detect failure of one system at an earlier timing than that of the monitoring circuit 44 using an abnormality of a source voltage of one microcomputer as an abnormality determination condition. As a result, when one system fails, the period in which the torque generated by the motor 10 becomes a half of the torque which is originally required is more shortened. It is also possible to secure trackability of the rotation angle θp(k) to the target angle θp*.

(3) It is also conceivable that the host ECU 50 erroneously determines an abnormality of a microcomputer of one system. Accordingly, the microcomputer of the other system determines that a process based on the instruction S4 is not to be performed when the instruction S4 is generated by the host ECU 50 and the communication between the microcomputers is normal. This is because the first microcomputer 30(1) and the second microcomputer 30(2) can be said to operate normally when the communication between the microcomputers is performed normally. The microcomputer of the other system determines that one system is normal and supply of electric power to the stator coil is performed without conforming to the instruction S4. Accordingly, an amount of current which is supplied to the stator coil of the other system is prevented from becoming greater than the originally required amount of current due to the erroneous determination of the host ECU 50 even if one system is normal. That is, it is possible to prevent an excessive torque from being generated by the motor 10 due to erroneous determination of the host ECU 50.

(4) When one system fails, the microcomputer of the normal system increases an amount of current which is supplied to the stator coil of the normal system in accordance with the instruction S4 from the host ECU 50 without waiting for the result of monitoring from the monitoring circuit 44. Here, it is conceivable that the host ECU 50 erroneously determines failure of the microcomputer of one system. In this case, there is concern about an amount of current supplied to the stator coil of the other system becoming greater than the originally required amount of current even if the microcomputer of one system is normal. Therefore, in this embodiment, when the microcomputer of the other system performs power supply control based on the instruction S4 from the host ECU 50, the feedback operation amount MFB(k) calculated in the feedback operation amount calculating process M20(k) of one system which is determined to be abnormal is forcibly set to zero. Accordingly, it is possible to prevent an excessive torque from being generated by the motor 10 due to erroneous determination of the host ECU 50.

(5) For example, it is conceivable that a communication state between the first microcomputer 30(1) and the second microcomputer 30(2) is unstable. In this case, for example, a result of determination indicating whether the communication between the microcomputers is normal, which is performed by the monitoring circuit 44, may frequently change between normality and abnormality. When the instruction S4 is generated by the host ECU 50, there is concern about the operation state of the control device 20 frequently switching between a state in which control based on the instruction S4 is performed and a state in which control not based on the instruction S4 is performed with the change of the result of determination indicating whether the communication between the microcomputers is normal. In this regard, according to this embodiment, in a period until automated driving ends after the microcomputer of the normal system has started performing of control based on the instruction S4 or a period until the operation state transitions to the one-system driving state (that is, a period until detection of an abnormality by the monitoring circuit 44 is settled), the microcomputer of the normal system continues to perform the control based on the instruction S4 regardless of the communication state between the microcomputers. Accordingly, since frequent great change of the amount of current supplied to the motor 10 is curbed, it is possible to allow the motor 10 to operate stably.

Second Embodiment

A control device for a motor according to a second embodiment will be described below. This embodiment basically has the same configuration as in the first embodiment illustrated in FIG. 1 and is different from the first embodiment in the processes which are performed by the k-th microcomputer 30(k) when one system fails. In the following description, when the process performed by the first microcomputer 30(1) and the process performed by the second microcomputer 30(2) are collectively denoted, they are also described using a symbol "k."

Figure 4:
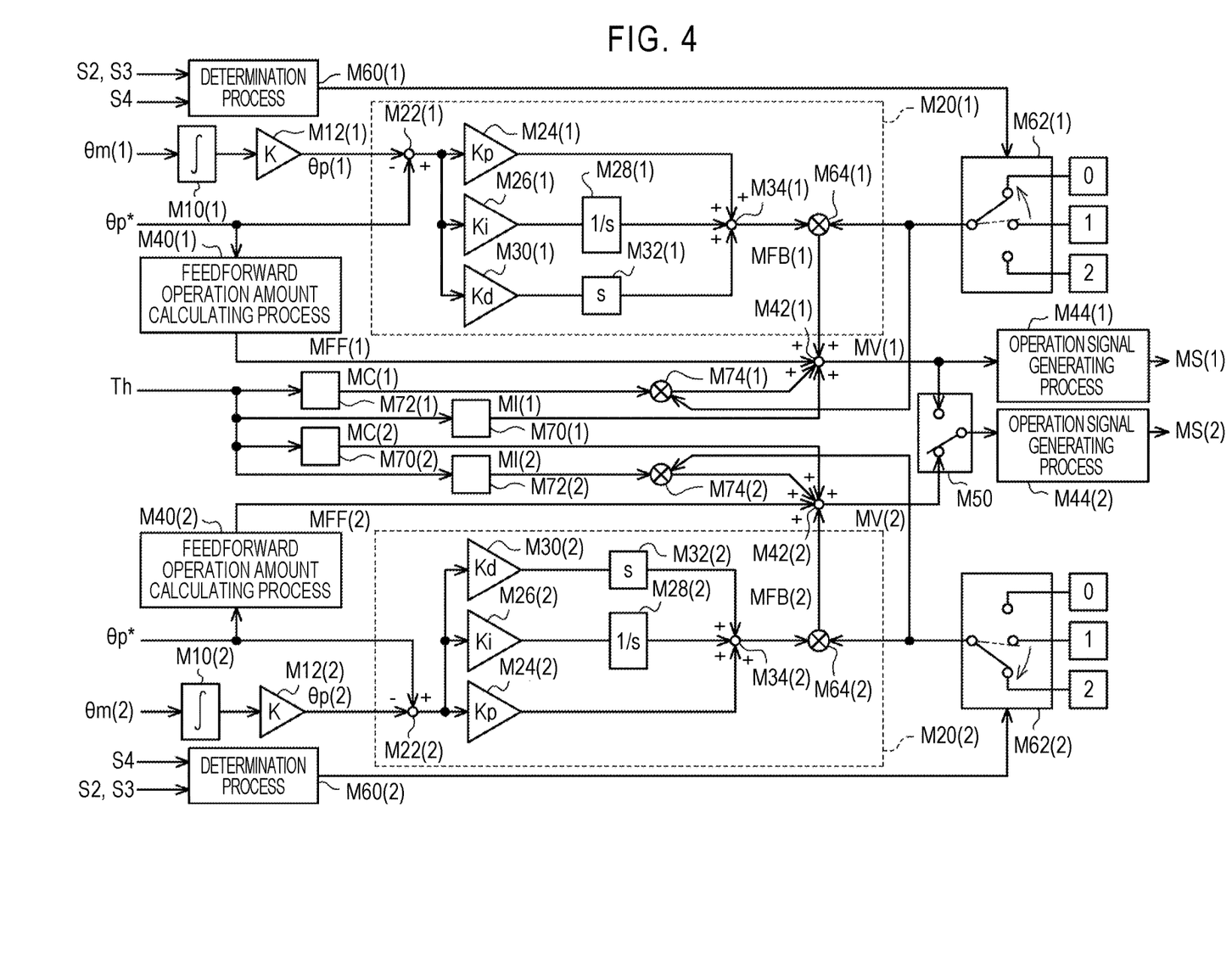
FIG. 4 is diagram illustrating a part of a routine which is performed by a control device for a motor according to a second embodiment when one system of two systems fails.

As illustrated in FIG. 4, a base assist value calculating process M70(k) is a process of calculating a base assist value MI(k) based on a steering torque Th which is detected by a torque sensor provided in the steering shaft. A driver's steering state is reflected in the steering torque Th. The base assist value MI(k) is a q-axis current command value indicating a value of an amount of current which is to be supplied to the motor 10 in order to generate an assist force with an appropriate magnitude based on the steering torque Th. The base assist value calculating process M70(k) calculates the base assist value MI(k) such that the absolute value thereof increases as the absolute value of the steering torque Th increases. A driver's steering is assisted with the torque which is generated by the motor 10.

An assist correction value calculating process M72(k) is a process of calculating an assist correction value MC(k) based on the steering torque Th. The assist correction value MC(k) is for cancelling out the feedback operation amount MFB(k) which is calculated in the feedback operation amount calculating process M20(k).

A multiplication process M74(k) is a process of multiplying the assist correction value MC(k) calculated in the assist correction value calculating process M72(k) by a gain (0, 1, or 2) which is calculated in a selection process M62(k).

Advantages of Second Embodiment

Accordingly, according to the second embodiment, the following operations and advantages can be obtained. (6) When control based on the instruction S4 from the host ECU 50 is being performed, the feedback operation amount MFB(k) which is calculated in the feedback operation amount calculating process M20(k) of a normal system has a value which doubles the feedback operation amount MFB(k) in a normal state in which the instruction S4 is not generated. Accordingly, when control based on the instruction S4 from the host ECU 50 is being performed, there is concern about the doubled feedback operation amount MFB(k) not being cancelled out by using the assist correction value MC(k) calculated in the assist correction value calculating process M72(k) without any change. In this regard, according to this embodiment, when control based on the instruction S4 from the host ECU 50 is performed, the assist correction value MC(k) of the normal system is doubled in the multiplication process M74(k). Accordingly, it is possible to more appropriately cancel out the doubled feedback operation amount MFB(k). As a result, when control based on the instruction S4 is being performed and a driver operates the steering wheel, the motor 10 generates an assist force corresponding to the base assist value MI(k). The driver's steering is assisted with the assist force. It is possible to improve a feeling of steering which is given to the driver.

In addition, a configuration in which the k-th microcomputer 30(k) does not perform a multiplication process for the assist correction value MC(k) may be employed depending on product specifications or the like. With this configuration, when control based on the instruction S4 from the host ECU 50 is being performed, the assist correction value MC(k) which is calculated in the assist correction value calculating process M72(k) is used without any change. That is, the assist correction value MC(k) is merely a value corresponding to the steering state. Accordingly, the doubled feedback operation amount MFB(k) cannot be appropriately cancelled out. Accordingly, in comparison with a case in which control based on the instruction S4 from the host ECU 50 is being performed and the multiplication process of the assist correction value MC(k) is performed or the automated driving control function is turned off, a reaction from the steering wheel (a steering reaction force) is slightly increased. With this increase of the reaction, the driver can be informed of the abnormality.

Other Embodiments

The first and second embodiments may be modified as follows. In the first and second embodiments, when one system fails, the microcomputer of the normal system increases an amount of current which is supplied to the k-th stator coil 14(k) by multiplying the feedback operation amount MFB(k) in accordance with the instruction S4 from the host ECU 50, but the output value of the proportional element, the output value of the integral element, and the output value of the differential element may be individually multiplied.

In the first and second embodiments, in the selection process M62(k), when the result of determination in the determination process M60(k) indicates an abnormality of the source voltage VB(k) of the k-th microcomputer 30(k) of the corresponding system, the feedback operation amount MFB(k) of the corresponding system is forcibly set to "0," but the operation of the feedback operation amount calculating process M20(k) may be stopped. When the result of determination in the determination process M60(k) indicates an abnormality of the source voltage VB(k) of the k-th microcomputer 30(k) of the corresponding system, the feedback operation amount MFB(k) may not be set to "0" as long as it is decreased.

The feedback operation amount MFB(k) is not limited to the sum of the output values of the proportional element M24(k), the integral element, and the differential element. For example, the feedback operation amount MFB(k) may be the sum of two output values of the proportional element and the integral element. The feedback operation amount MFB(k) may be the sum of the two output values of the integral element and the differential element. The feedback operation amount MFB(k) may be the output value of the integral element.

In the first and second embodiments, it is not essential to calculate the k-th operation amount MV(k) based on the feedforward operation amount MFF(k). That is, the feedforward operation amount calculating process M40(k) may be omitted in the processes which are performed by the CPU 32(k). In this case, the feedback operation amount MFB(k) which is calculated by the feedback operation amount calculating process M20(k) serves as the k-th operation amount MV(k).

For example, a dedicated hardware circuit which is provided particularly for a specific application such as an application-specific integrated circuit (ASIC) may be employed as the control device 20 instead of the k-th microcomputer 30(k) including the CPU 32(k) as a software processing circuit that executes a program stored in a storage device. A configuration in which a software processing circuit and a dedicated hardware circuit are mixed may be employed as the control device 20.

The number of control systems of the control device 20 has only to be the same as the number of systems of the motor. For example, when the motor includes three systems of coils, the control device 20 can include three control systems. In this case, it is preferable that one control system of a plurality of control systems of the control device 20 be used as a master system and the other control system be used as a slave system.

A configuration in which the relays 26(1) and 26(2) are omitted may be employed as the control device 20. The control device 20 may control a motor which is a drive source of a steer-by-wire turning actuator in which power transmission with the steering wheel is cut off.

In the first and second embodiments, when both systems are normal, the second operation signal generating process M44(2) calculates the operation signal MS(2) of the second inverter 22(2) using a value obtained by dividing the first operation amount MV(1) selected in the selection process M50 according to the number of control systems, but the operation signal may be calculated as follows. That is, when both systems are normal, the second operation signal generating process M44(2) calculates the operation signal MS(2) of the second inverter 22(2) using the second operation amount MV(2). In this case, a process in which the selection process M50 is omitted may be employed as the process which is performed by the CPU 32(2).

What is claimed is:

1. A control device for a motor which turns turning wheels of a vehicle and which includes a first coil and a second coil insulated from each other, the control device comprising:
    a first circuit that calculates a first amount of operation corresponding to a torque which is generated by the motor to feedback-control an angle which is able to be converted to a turning angle of the turning wheels and which is detected by a first sensor such that the angle becomes a target angle which is calculated by an external circuit and controls supply of electric power to the first coil based on a value which is obtained by dividing the first amount of operation according to the number of control systems; and
    a second circuit that calculates a second amount of operation corresponding to the torque which is generated by the motor to feedback-control an angle detected by a second sensor such that the angle becomes the target angle, selectively performs a first process of controlling supply of electric power to the second coil based on a value which is obtained by dividing the first amount of operation according to the number of control systems and a second process of controlling supply of electric power to the second coil based on a value which is obtained by dividing the second amount of operation according to the number of control systems, and switches the first process to the second process when the first circuit fails,
    wherein the external circuit generates an instruction for performing a process of increasing an amount of operation which is calculated by one of the first circuit and the second circuit according to the number of control systems when the other of the first circuit and the second circuit fails.

2. The control device according to claim 1, wherein the external circuit determines that one of the first circuit and the second circuit fails and generates the instruction when communication with one of the first circuit and the second circuit is disrupted and when an abnormality in mutual communication between the first circuit and the second circuit is recognized through communication with the other of the first circuit and the second circuit.

3. The control device according to claim 1, further comprising a monitoring circuit that monitors at least whether an abnormal state of a source voltage of the first circuit and the second circuit is maintained for a set time,
wherein the first circuit and the second circuit increase an amount of operation of one of the first circuit and the second circuit according to the number of control systems when it is recognized that the other of the first circuit and the second circuit fails based on a result of monitoring from the monitoring circuit.

4. The control device according to claim 3, wherein:
the monitoring circuit also monitors mutual communication between the first circuit and the second circuit; and
the first circuit and the second circuit do not employ the instruction when the instruction is generated and it is recognized that the mutual communication between the first circuit and the second circuit is normal based on the result of monitoring.

5. The control device according to claim 1, wherein one of the first circuit and the second circuit performs a process of decreasing its own amount of operation when the other of the first circuit and the second circuit is increasing its own amount of operation according to the number of control systems in accordance with the instruction.

6. The control device according to claim 1, wherein the first circuit or the second circuit maintains a state in which its own amount of operation is increased according to the number of control system when the instruction from the external circuit is disrupted after having started performing the process in accordance with the instruction.

7. The control device according to claim 1, wherein:
the first circuit performs a process of calculating a first assist value for causing the motor to generate a steering assist force according to a steering state and adding the first assist value to the first amount of operation and a process of calculating a first assist correction value for cancelling out the first amount of operation for feedback-controlling the angle such that the angle becomes the target angle according to the steering state and adding the first assist correction value to the first amount of operation; and
the second circuit performs a process of calculating a second assist value for causing the motor to generate a steering assist force according to the steering state and adding the second assist value to the second amount of operation and a process of calculating a second assist correction value for cancelling out the second amount of operation for feedback-controlling the angle such that the angle becomes the target angle according to the steering state and adding the second assist correction value to the second amount of operation.

8. The control device according to claim 7, wherein one of the first circuit and the second circuit increases an assist correction value calculated thereby according to the number of control systems when the other of the first circuit and the second circuit performs control in accordance with the instruction.

9. A control device for a motor which turns turning wheels of a vehicle and which includes a first coil and a second coil insulated from each other, the control device comprising:
a first circuit that calculates a first amount of operation corresponding to a torque which is generated by the motor to feedback-control an angle which is able to be converted to a turning angle of the turning wheels and which is detected by a first sensor such that the angle becomes a target angle which is calculated by an external circuit and controls supply of electric power to the first coil based on a value which is obtained by dividing the first amount of operation according to the number of control systems; and
a second circuit that calculates a second amount of operation corresponding to the torque which is generated by the motor to feedback-control an angle detected by a second sensor such that the angle becomes the target angle and controls supply of electric power to the second coil based on a value which is obtained by dividing the second amount of operation according to the number of control systems,
wherein the external circuit generates an instruction for performing a process of increasing an amount of operation which is calculated by one of the first circuit and the second circuit according to the number of control systems when the other of the first circuit and the second circuit fails.

10. The control device according to claim 9, wherein the external circuit determines that one of the first circuit and the second circuit fails and generates the instruction when communication with one of the first circuit and the second circuit is disrupted and when an abnormality in mutual communication between the first circuit and the second circuit is recognized through communication with the other of the first circuit and the second circuit.

11. The control device according to claim 9, further comprising a monitoring circuit that monitors at least whether an abnormal state of a source voltage of the first circuit and the second circuit is maintained for a set time,
wherein the first circuit and the second circuit increase an amount of operation of one of the first circuit and the second circuit according to the number of control systems when it is recognized that the other of the first circuit and the second circuit fails based on a result of monitoring from the monitoring circuit.

12. The control device according to claim 11, wherein:
the monitoring circuit also monitors mutual communication between the first circuit and the second circuit; and
the first circuit and the second circuit do not employ the instruction when the instruction is generated and it is recognized that the mutual communication between the first circuit and the second circuit is normal based on the result of monitoring.

13. The control device according to claim 9, wherein one of the first circuit and the second circuit performs a process of decreasing its own amount of operation when the other of the first circuit and the second circuit is increasing its own amount of operation according to the number of control systems in accordance with the instruction.

14. The control device according to claim 9, wherein the first circuit or the second circuit maintains a state in which its own amount of operation is increased according to the number of control system when the instruction from the external circuit is disrupted after having started performing the process in accordance with the instruction.

15. The control device according to claim 9, wherein:
the first circuit performs a process of calculating a first assist value for causing the motor to generate a steering assist force according to a steering state and adding the first assist value to the first amount of operation and a process of calculating a first assist correction value for cancelling out the first amount of operation for feedback-controlling the angle such that the angle becomes the target angle according to the steering state and adding the first assist correction value to the first amount of operation; and the second circuit performs a process of calculating a second assist value for causing the motor to generate a steering assist force according to the steering state and adding the second assist value to the second amount of operation and a process of calculating a second assist correction value for cancelling out the second amount of operation for feedback-controlling the angle such that the angle becomes the target angle according to the steering state and adding the second assist correction value to the second amount of operation.

16. The control device according to claim 15, wherein one of the first circuit and the second circuit increases an assist correction value calculated thereby according to the number of control systems when the other of the first circuit and the second circuit performs control in accordance with the instruction.

\* \* \* \* \*